July 13, 1965    H. J. MUMMA    3,193,980
ARTICLE TRANSFER MECHANISM
Original Filed June 1, 1953    11 Sheets-Sheet 1
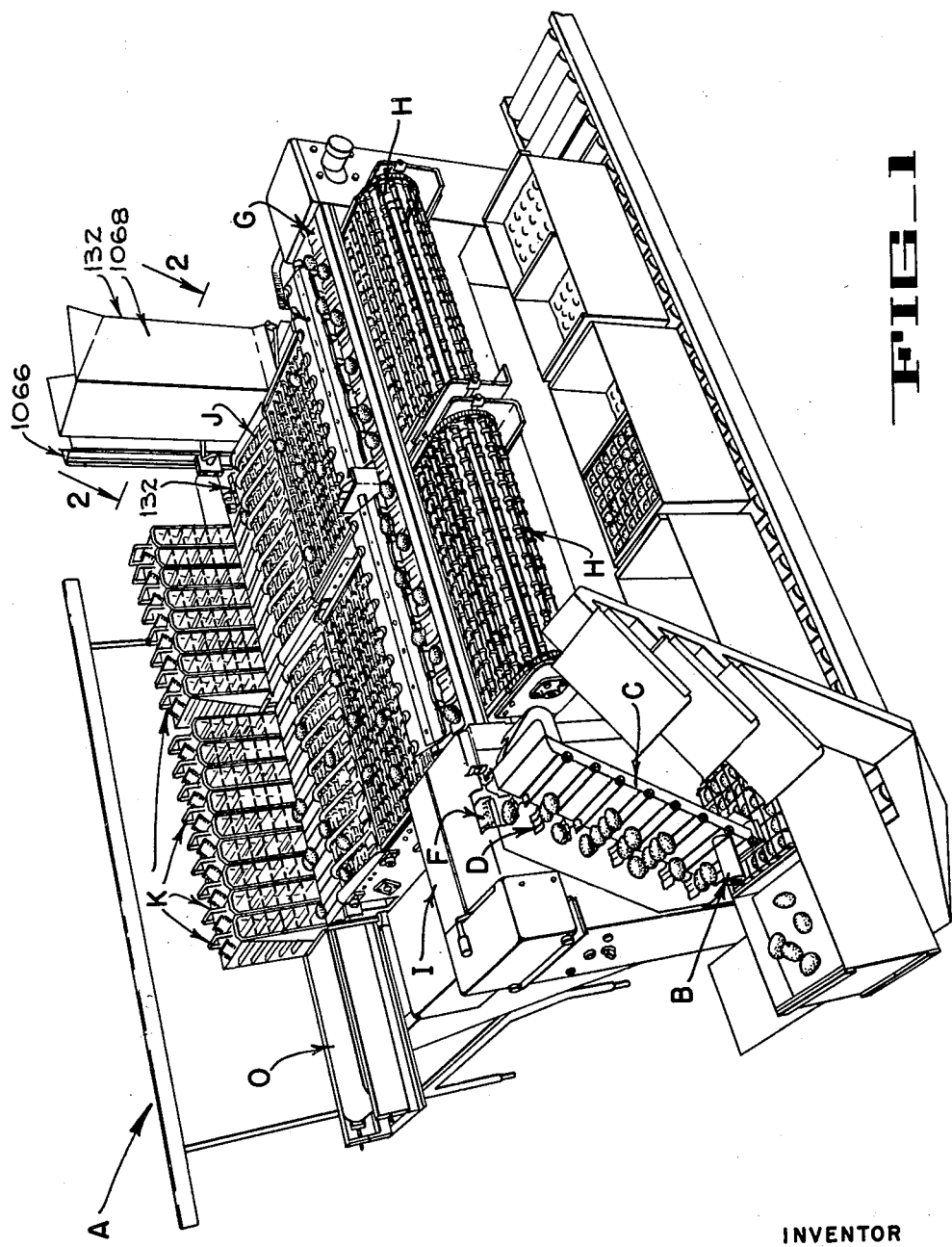
FIG_1
INVENTOR
HAROLD J. MUMMA
BY *Hans G. Hoffmeister*
ATTORNEY

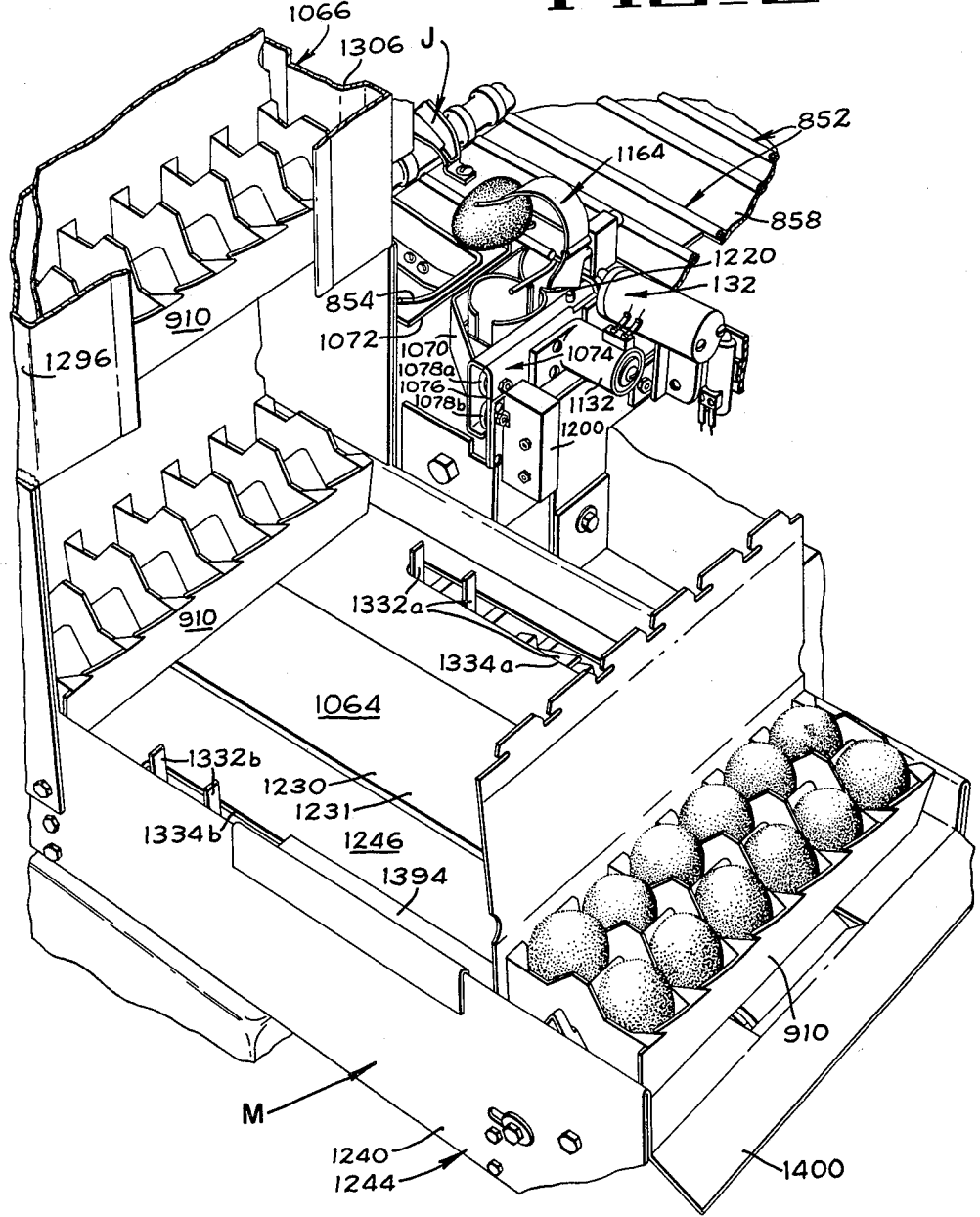

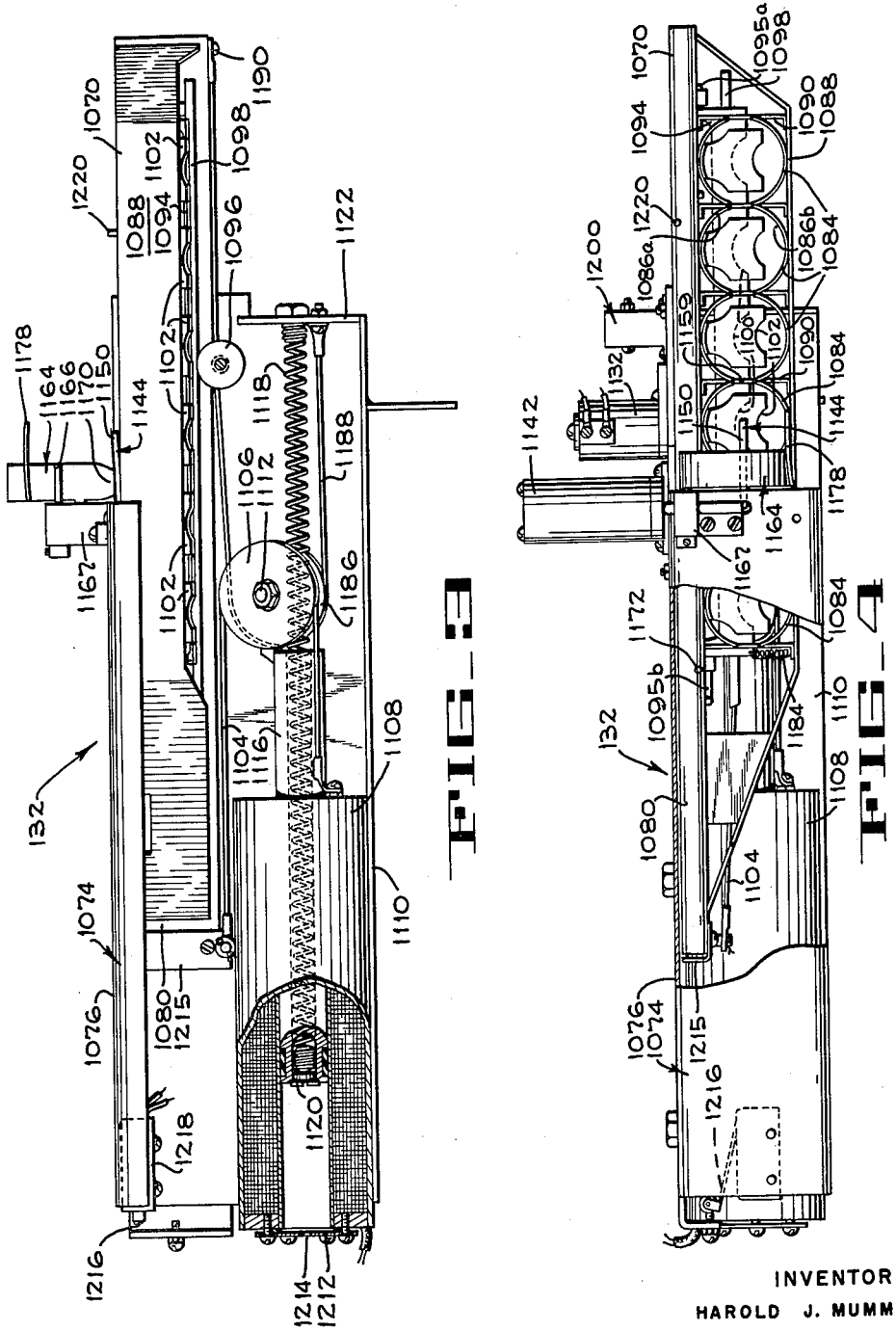

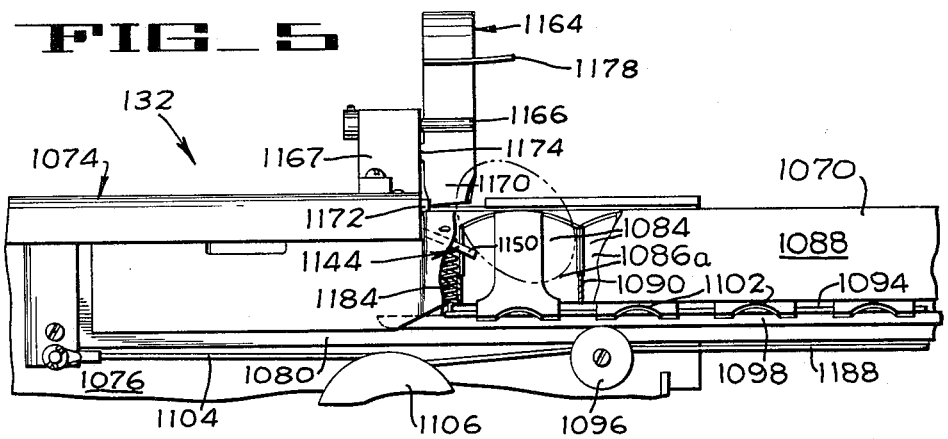
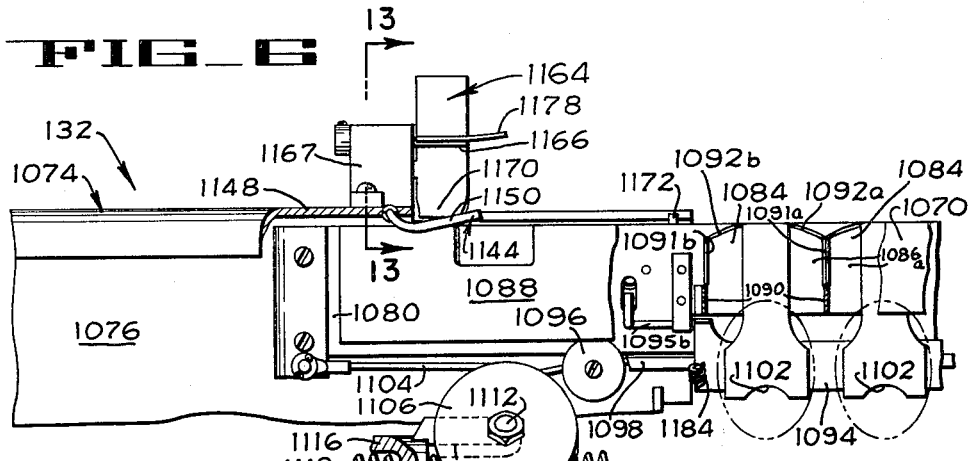
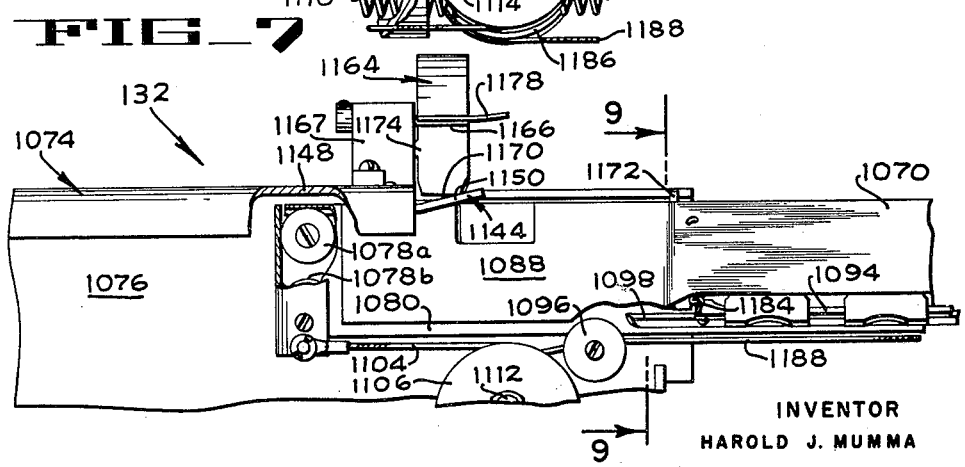

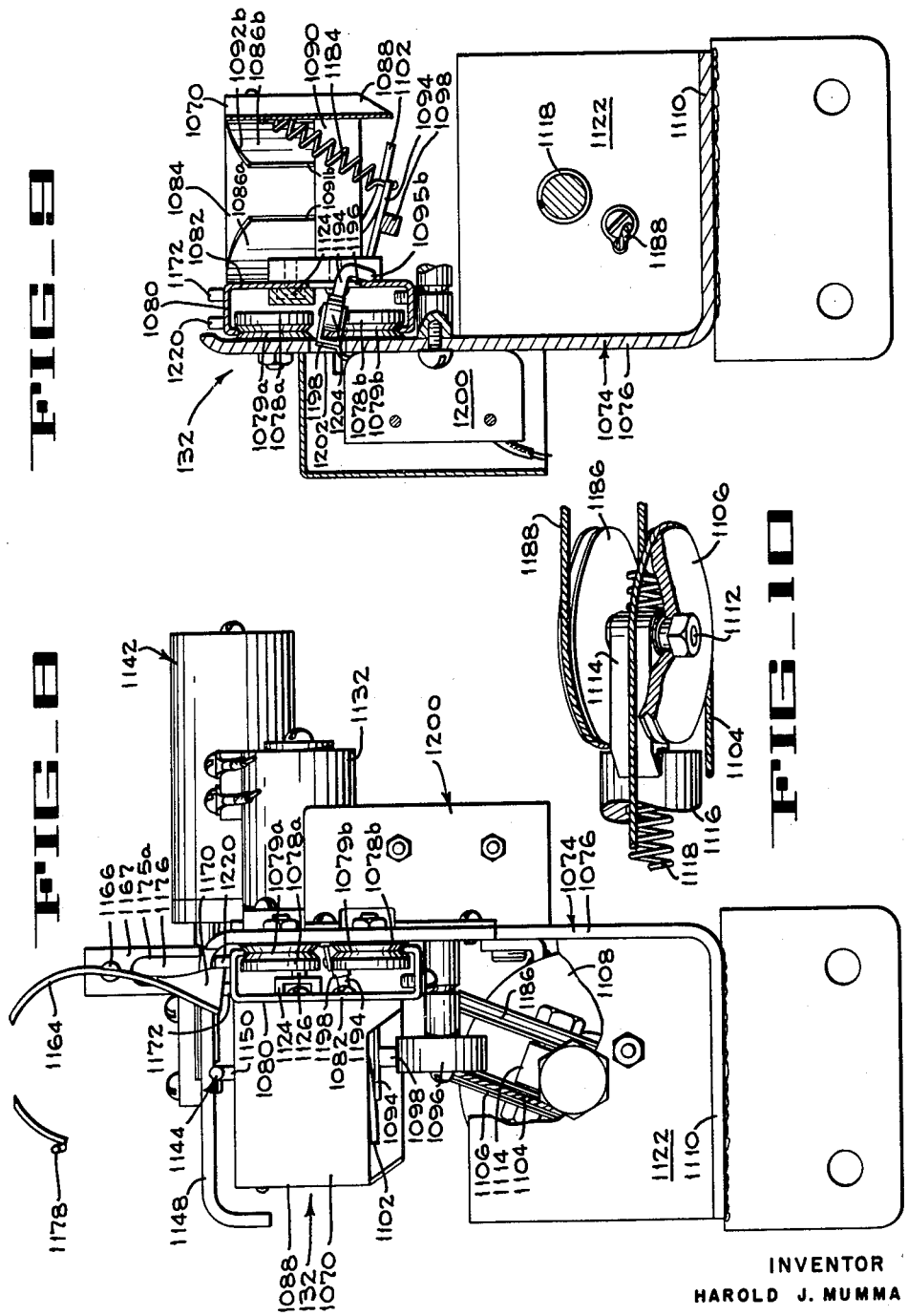

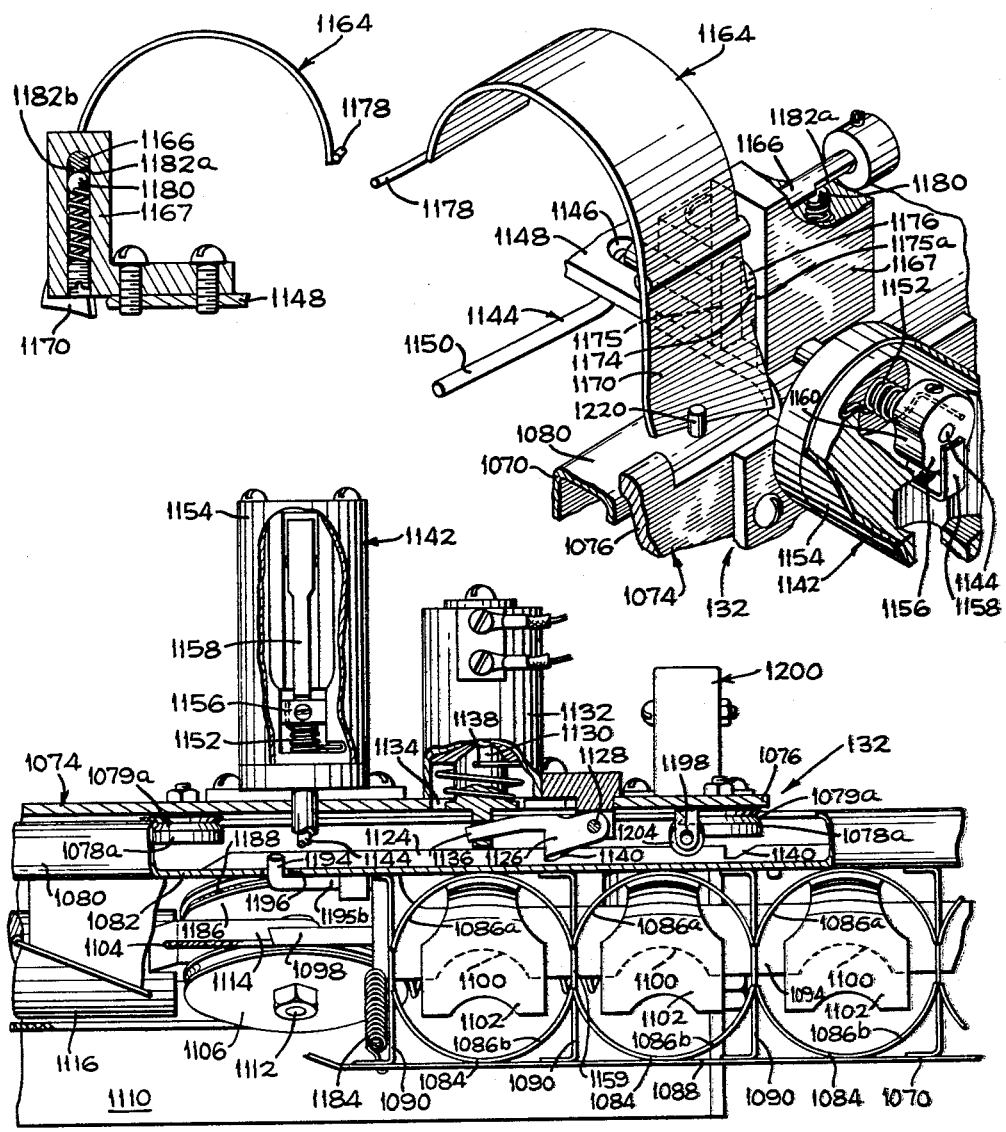

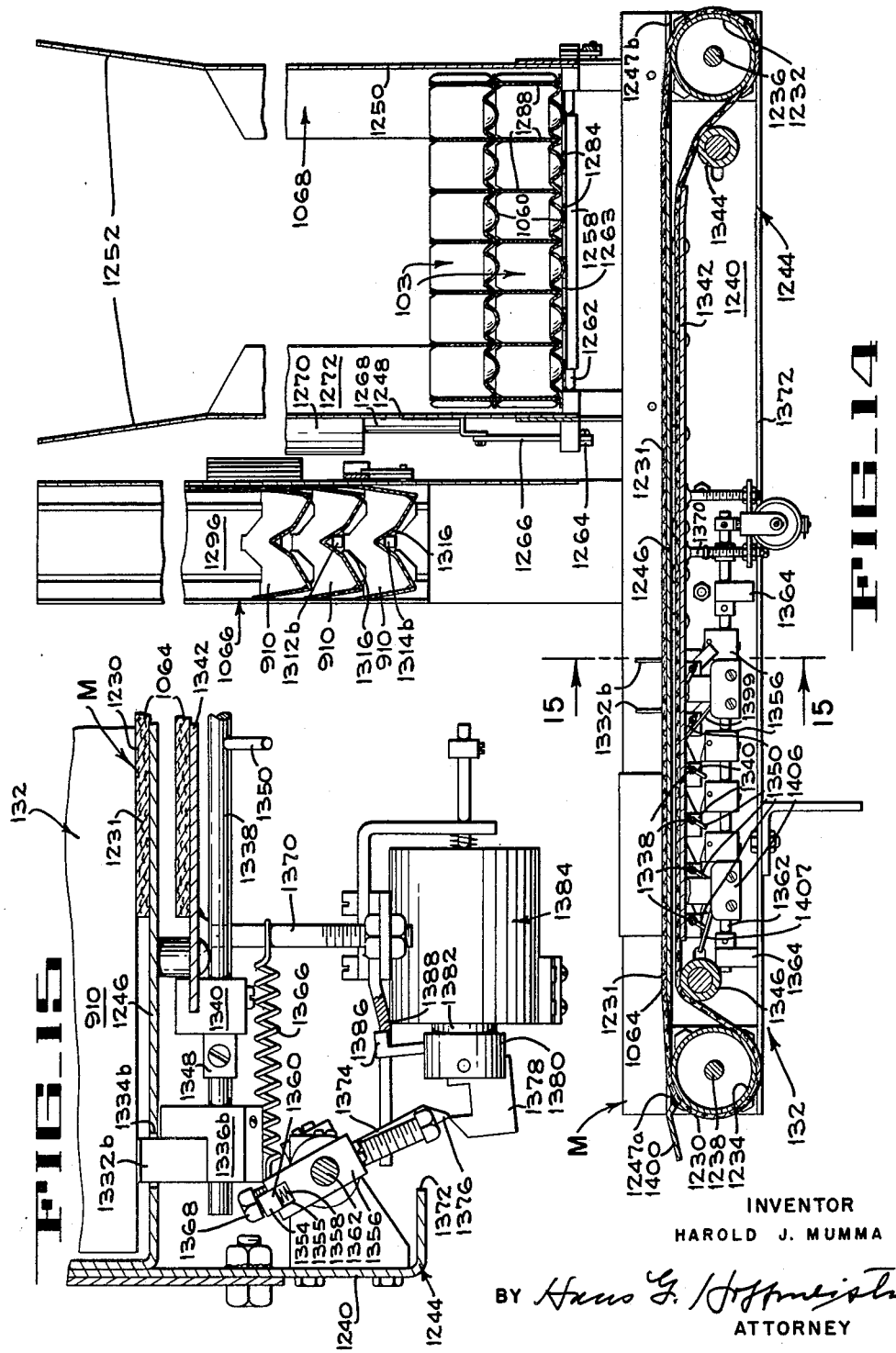

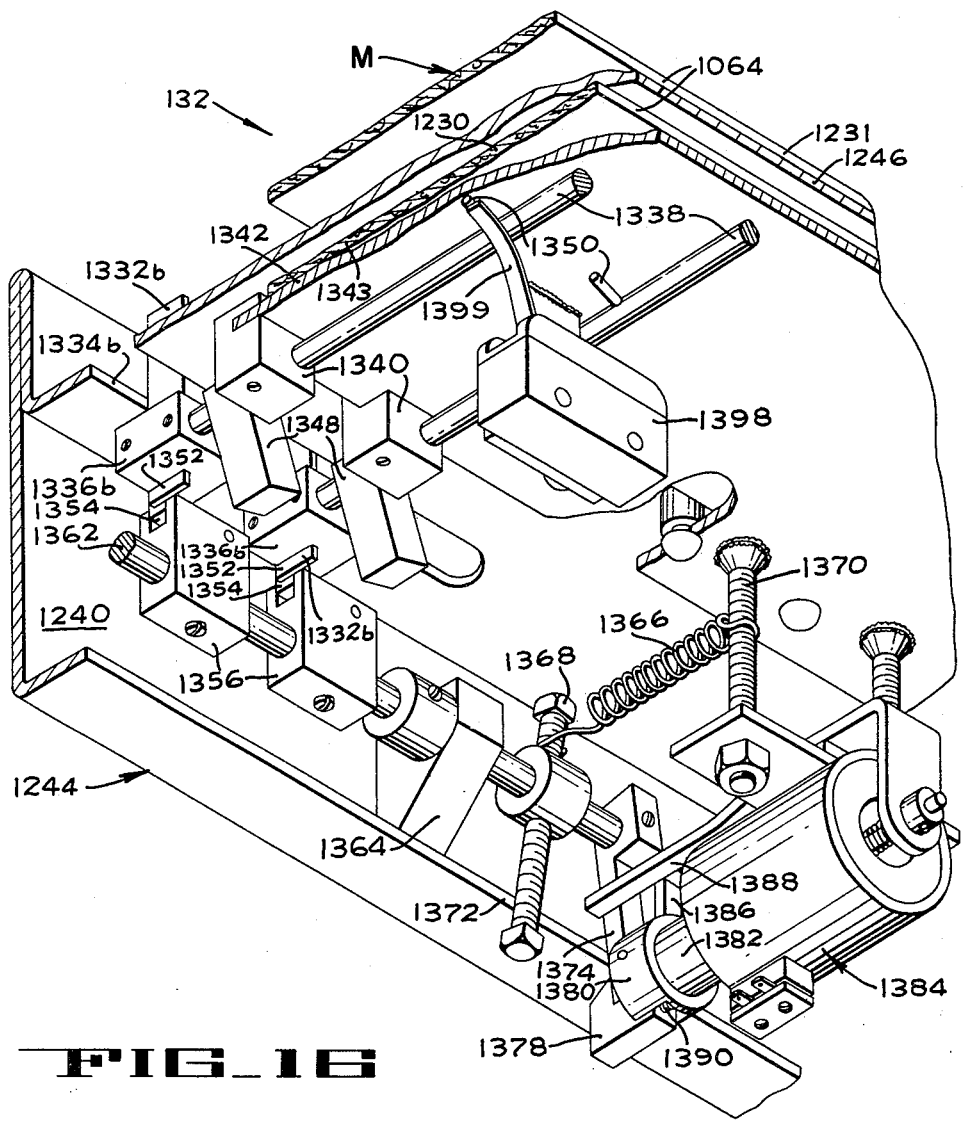

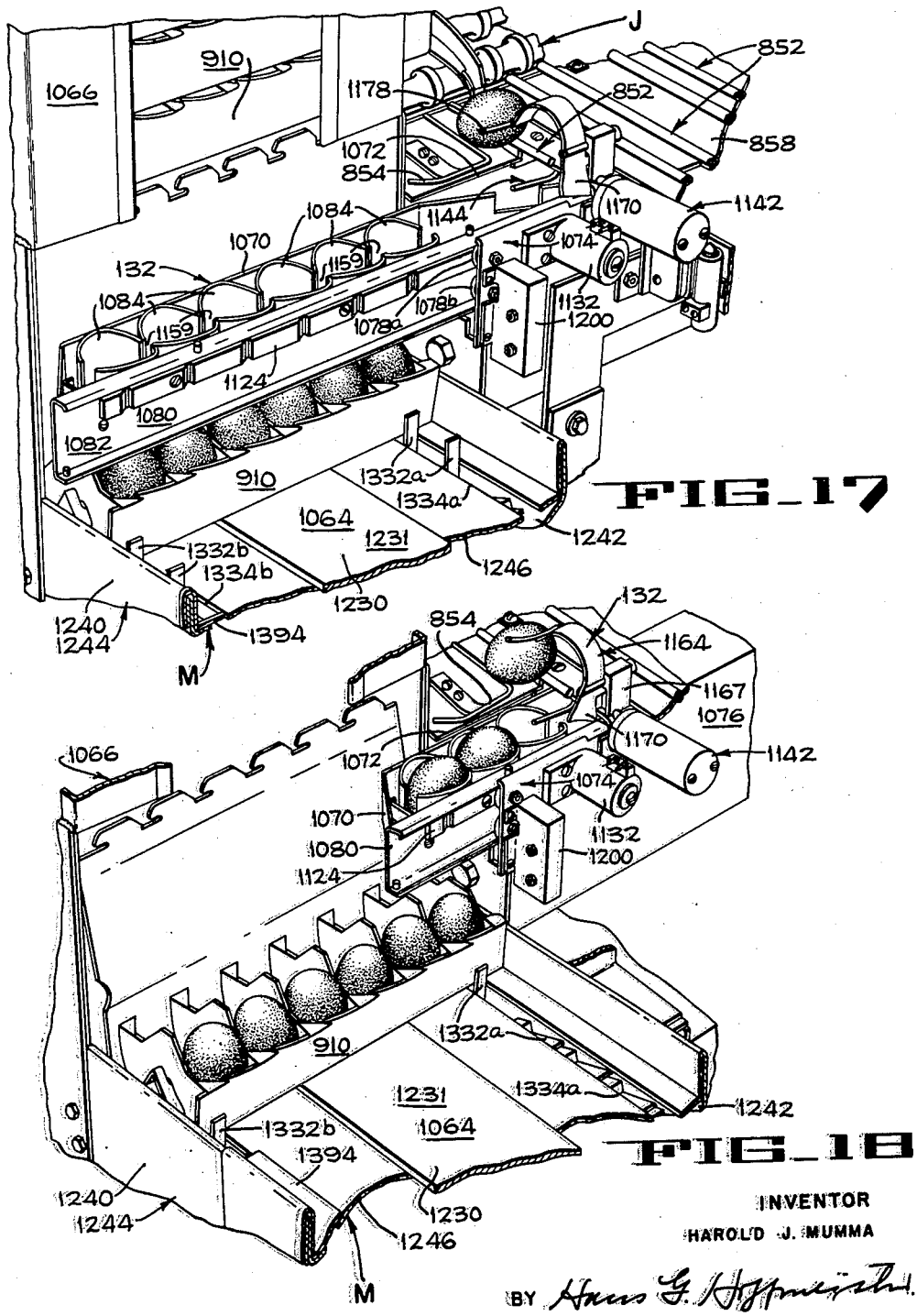

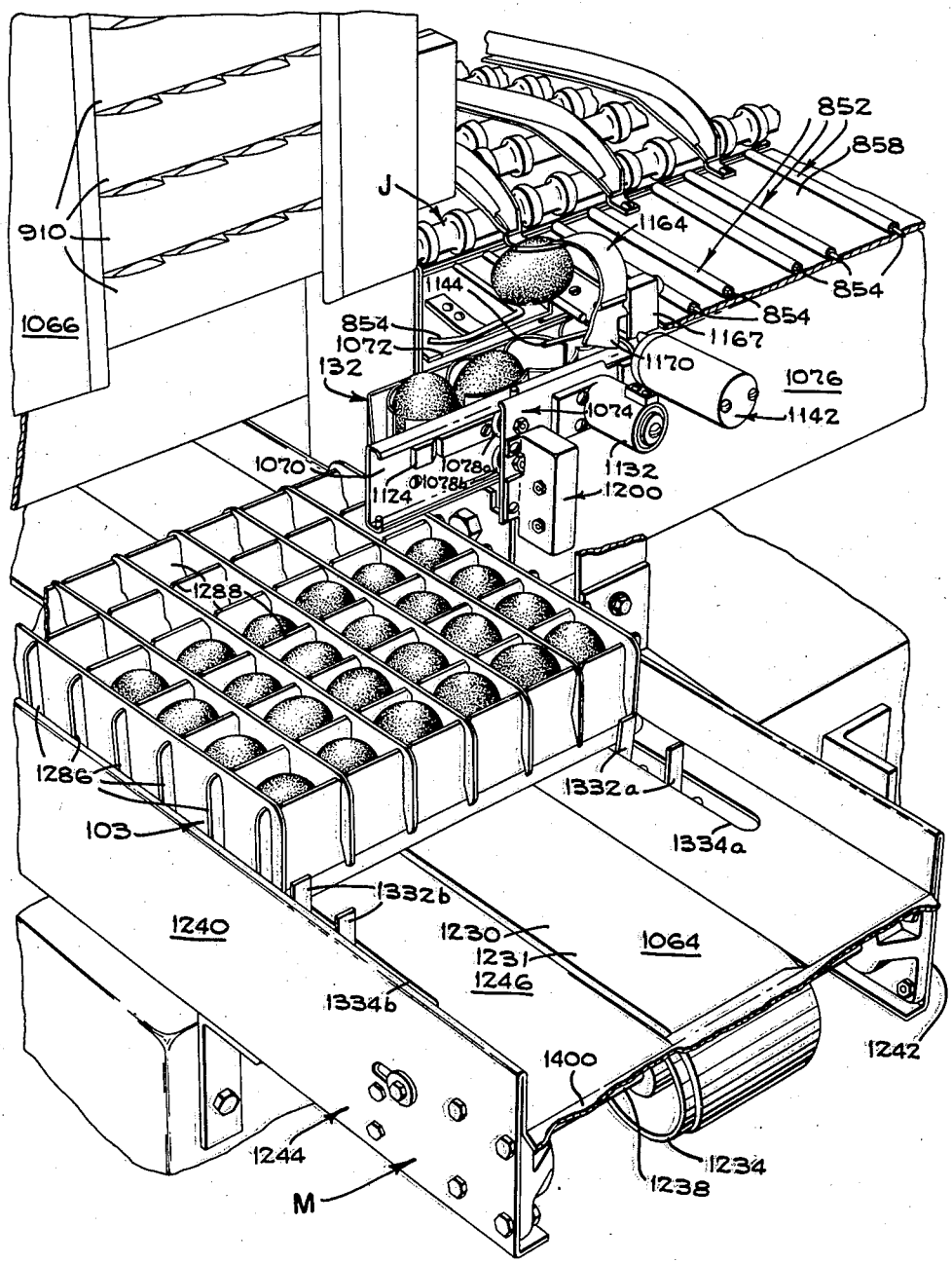
FIG_19

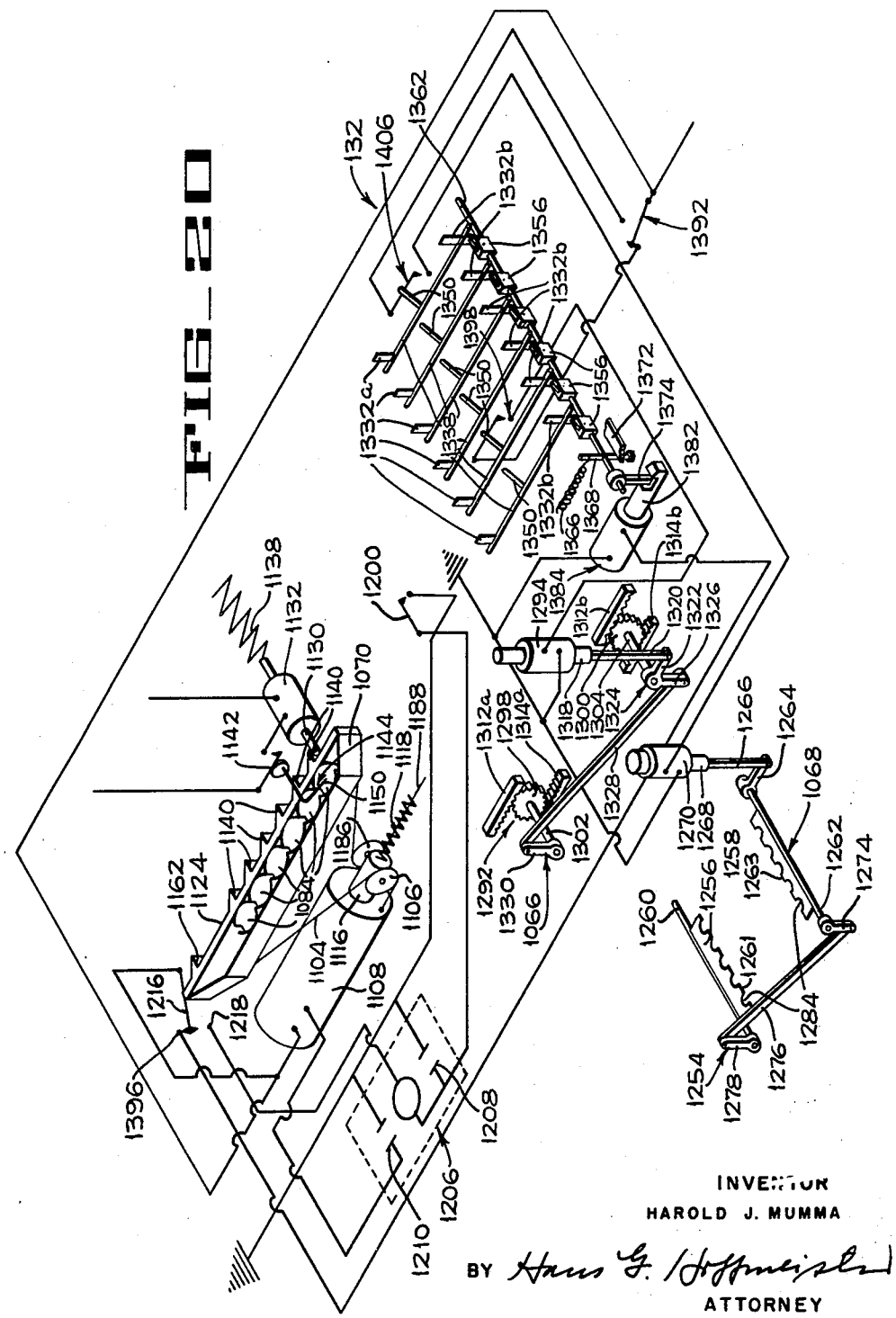

United States Patent Office 3,193,980
Patented July 13, 1965

3,193,980
ARTICLE TRANSFER MECHANISM
Harold J. Mumma, Riverside, Calif., assignor to FMC Corporation, San Jose, Calif., a corporation of Delaware
Original application June 1, 1953, Ser. No. 358,621, now Patent No. 2,993,592, dated July 25, 1961. Divided and this application July 13, 1961, Ser. No. 123,724
15 Claims. (Cl. 53—55)

The present invention pertains to machines for transferring articles from one place to another and more particularly relates to machines for inserting eggs into cartons and into grid-shaped fillers for egg cases.

The present application is a division of the copending application of Harold J. Mumma, Serial No. 358,621 for a Machine for Handling Eggs of Different Quality and Weight filed June 1, 1953, now Patent No. 2,993,592 granted July 25, 1961. In the egg handling machine disclosed in the parent application, eggs are manually placed in the machine and are automatically subjected to weighing, sorting and packing operations. At one part of the packing operation the weighed and sorted eggs are selectively placed into either the usual two-row cardboard cartons or into grid-shaped fillers used to support eggs when packed in cases. It is the mechanism for automatically accomplishing these two packing operations which forms the present invention.

An object of the present invention is to provide an improved article transfer mechanism.

Another object of the present invention is to provide an egg packing mechanism for automatically filling either egg cartons or egg grids.

Another object is to provide a mechanism for automatically accumulating a series of eggs from a single-file conveyor, automatically transferring the series of eggs into one pocket row of a multi-row egg container and advancing the container for filling the next empty row while accumulating the next series of eggs for transfer into container.

Another object of the present invention is the provision of a transfer mechanism for transferring eggs from a single file conveyor lane into multi-row egg containers.

These and further objects and advantages of the present invention will be apparent from the following detailed description taken in connection with the accompanying drawings, in which:

FIGURE 1 is a perspective illustrating the egg processing machine in which the transfer mechanism of the present invention is incorporated.

FIGURE 2 is a fragmentary perspective, taken looking in the direction of arrows 2, 2 of FIGURE 1 and illustrating a carton filling station of an egg handling machine, and a portion of the egg transfer mechanism of the present invention which fills the eggs into cartons or into grids.

FIGURE 3 is a side elevation, partly broken away, of the egg transfer mechanism of the present invention.

FIGURE 4 is a plan, partly broken away, of the egg transfer mechanism illustrated in FIGURE 3.

FIGURES 5–7 are fragmentary side elevations of the egg transfer mechanism shown in three consecutive operational positions.

FIGURE 8 is an end elevation of the egg transfer mechanism, partly broken away to show structure otherwise concealed.

FIGURE 9 is a cross section through the egg transfer mechanism, and is taken along line 9—9 of FIG. 7.

FIGURE 10 is a fragmentary perspective of a pulley device incorporated in the egg transfer mechanism of the invention.

FIGURE 11 is a fragmentary plan view of the egg transfer mechanism, similar to FIGURE 4, but drawn at a larger scale and in a different operational position.

FIGURE 12 is a perspective of a gate mechanism that controls the flow of eggs into the egg transfer mechanism.

FIGURE 13 is a section through the gate mechanism of FIGURE 12, and is taken along line 13—13 of FIGURE 6.

FIGURE 14 is a longitudinal vertical section through an egg carton and egg grid conveyor of the packing station shown in FIG. 2.

FIGURE 15 is a fragmentary cross section through the carton and grid conveyor, the section being taken along line 15—15 of FIG. 14.

FIGURE 16 is a fragmentary perspective of the carton and grid conveyor viewed from a point below said conveyor.

FIGURES 17 and 18 are fragmentary perspectives similar to FIGURE 2 and illustrating successive operational positions of the mechanism during the filling of an egg carton.

FIGURE 19 is a fragmentary perspective similar to FIGURES 17 and 18 but illustrating the filling of an egg grid.

FIGURE 20 is an electrical diagram of the control mechanism connected to the carton conveyor and to the egg transfer mechanism for correlating their interaction.

In the maner explained in detail in the previously identified parent application, the egg handling machine A (FIGURE 1) in which the article mechanism of the present invention is used includes a candling station B where an operator candles or sorts a supply of eggs according to their internal and external quality. Each egg, after being inspected by the operator, is placed on one of a plurality of inclined racks on a grading board C, from which the eggs are automatically fed to a single file elevator D. As the egg is transferred to the elevator, a memory device records the quality of the egg according to which rack delivered the egg to the elevator.

The elevator D transfers the eggs to a scale mechanism F which discharges the weighed eggs onto a single file conveyor G that extends across one end of a multi-lane classification conveyor H. At the time each egg is weighed on the scale F, the memory device located in a cabinet I records the weight of the egg. Subsequently, the memory device causes discharge of the classified egg from the single-file conveyor G into one of the lanes of the classification conveyor H. Eggs of particular quality and weight combinations are thus assembled into specified lanes of the conveyor H.

The discharge ends of all lanes of conveyor H, except the lane J which is farthest from the scale mechanism F, are arranged to feed eggs to a group of egg accumulators K which arrange the graded eggs in superposed tiers so that the eggs can be manually packed into suitable paperboard containers. The last lane J of conveyor G conveys graded eggs to the article transfer mechanism 132 of the present invention, which mechanism automatically collects and deposits a six-egg row of eggs into a corresponding row of pockets in a cardboard egg carton, or into a grid-shaped cardboard filler for egg cases. The cartons or grids are automatically positioned for filling beneath the transfer mechanism 132 by a cooperating container conveyor M which selectively handles either type of container, and deposits each filled container on a discharge conveyor O for further handling operations at another location.

The egg packing mechanism 132 comprises a conveyor 1064 (FIG. 2) arranged to deliver cartons or cardboard grids from selectively operable supply magazines 1066 and 1068, respectively (FIG. 14), into an egg receiving position below a transversely movable egg accumulating carriage 1070 (FIG. 2) that receives the eggs individually from the eighteenth classification lane and moves laterally across the carton supply conveyor into vertical alignment with a carton or cardboard grid on said conveyor underneath. When in said position, the carriage discharges the eggs into a pocket row of the carton or cardboard grid whereupon it returns to its initial position laterally removed from the conveyor and initiates operation of the mechanism that permits the carton or cardboard grid upon the conveyor to advance by a distance equal to the width of an egg pocket row so as to place the next row of pockets below the path of the carriage across the carton supply conveyor.

Having reference to FIGURE 2, the left corner of the front edge of ramp plate 858 is cut back along a line below the right guide wire 854 of the eighteen feed track to form a recess 1072, and the left guide wire 854 of said feed track is bent outwardly at right angles to follow the transverse edge of said recess 1072. Suitably supported from the machine frame and extending somewhat below the lower edge of the ramp plate 858 is a channel 1074 of C-shaped cross section (FIG. 8) whose open side faces in a direction opposite to the direction of travel of the eggs on the feed ramp. Pivoted to the inner face of the vertical wall 1076 of said channel at longitudinally spaced points therefor are pairs of vertically superposed pulleys 1078a and 1078b (FIGS. 8, 9 and 11) whose grooved peripheries 1079a and 1079b are engaged by the opposed edges of another C-shaped channel 1080 that is of smaller dimension than the channel 1074 and which faces in a direction opposite the said channel 1074. Rigidly supported from the outside of the vertical wall 1082 of the smaller channel 1080 are six upright tubular pockets 1084 (FIG. 4) formed by rows of semi-cylindrical shell segments 1086a and 1086b that face each other with their concave surfaces and which are secured to the outside of the vertical wall 1082 of channel 1080 and to a metal band 1088, respectively, whose opposite ends converge toward and are rigidly secured to said channel wall 1082. To impart sturdiness to the described arrangement, plates 1090 may be interposed between the channel wall 1082 and the band 1088 at either end of the pocket row and intermediately the individual pockets thereof. The upper edges of the semi-cylindrical pocket segments 1086a and 1086b may be arranged to decline slightly toward their vertical side edges 1091a and 1091b, respectively, to form relatively inclined guide lines 1092a and 1092b that funnel an egg into the pockets formed therebetween (FIGS. 6 and 9). At their lower ends, the tubular pockets 1084 are closed by a common elongated board 1094 (FIGS. 5, 8 and 9) that is hinged to the vertical wall 1082 of the channel 1080 by means of hinge pins 1095a and 1095b. Said board is held in horizontal egg retaining position by a roller 1096 which is pivotally supported from the vertical wall 1076 of the stationary channel 1074 at a point near the outer end thereof and which engages a track bar 1098 extending along, and secured to the bottom face of, said board 1094. Below each of the pockets 1084, the front edge of floor board 1094 is provided with arched recesses 1100 (FIGS. 4 and 11) and aprons 1102 of an elastic material, such as rubber, may be attached to the semi-cylindrical pocket segments 1086a above the hinged edge of said board and lie loosely upon said board as best shown in FIG. 11.

Means are provided to urge the pocket supporting carriage 1070 formed by channel 1080 in a direction out of the stationary mounting channel 1074 across the hereinbefore mentioned carton supply conveyor 1064. For this purpose, a cord 1104 secured to the inner end of the carriage channel 1080 is trained over a pulley 1106 and has its other end secured to the inner face of a solenoid 1108 (FIG. 3) that rests upon the lower bar 1110 of the C-shaped mounting channel 1074 adjacent the inner end thereof. The pulley 1106 turns upon a pivot 1112 held in a bracket arm 1114 that is rigidly secured to the tubular armature 1116 of said solenoid 1108 (FIGS. 3 and 10). A powerful coil spring 1118 extending through the hollow interior of the armature 1116 and tensioned between a screw bolt 1120 engaging the inner end thereof and a mounting plate 1122 secured to the stationary channel 1074 at the outer end thereof urges the armature 1116 and hence the pulley 1106 toward said mounting plate, and in this manner urges the pocket supporting carriage channel 1080 in a direction out of the mounting channel and across the carton supply conveyor as pointed out hereinbefore. However, the inner face of the carriage channel 1080 carries rigidly secured thereto a rack bar 1124 (FIGS. 11 and 20) that is engaged by a latch dog 1126 which is pivotally supported at 1128 from the mounting channel 1074, as shown in FIG. 11, and which is forced into latching position by the armature 1130 of a solenoid 1132 that is suitably supported from the outer face of the vertical channel wall 1076. The armature 1130 extends through an aperture 1134 in said vertical wall 1076 and is urged outwardly of its solenoid by suitable spring means 1138. Its outwardly projecting end embraces a tail 1136 formed on the latch dog 1126 as best shown in FIG. 11. Initially, the latch dog 1126 engages the foremost one of the teeth 1140 formed on the rack bar 1124 to hold the carriage in a position wherein its foremost pocket 1084 is located within the confines of the recess 1072 of the ramp plate 858 directly below the feed track of the eighteenth classification lane as illustrated in FIG. 2. Means are provided to retract the armature 1130 briefly whenever an egg is delivered from said feed track into a pocket 1084 so that the coil spring 1118 may advance the carriage by an increment appropriate to place the next succeeding pocket below the eighteenth feed track, at which point the armature 1130 forces the latch dog 1126 to engage the next succeeding tooth 1140 in the rack 1124, and in this manner holds said succeeding pocket below the eighteenth feed track until an egg has been delivered thereinto.

For this purpose, the power circuit of the solenoid 1132 contains normally open switch 1142 (FIG. 20) that is likewise supported from the vertical wall of the stationary mounting channel 1074 (FIG. 11) and which has a rotary actuating arm 1144 that extends in a slot 1146 provided in the upper flange 1148 of the C-shaped mounting channel 1074. Said arm 1144 has a radially directed end portion 1150 (FIG. 4) that is located opposite the end of the eighteenth feed track 852. A spring 1152 coiled about the rotary arm 1144 within the housing 1154 of the switch 1142 (FIG. 12) yieldably maintains said arm in a rotary position wherein its radially directed end portion 1150 lies substantially in a horizontal plane, and wherein a rotary cam plate 1156 secured to the inner end of said arm maintains a resilient actuating interponent 1158 in switch opening condition.

Whenever an egg rolls down the eighteenth feed track and encounters the recess 1072 in the ramp plate 858, it tips over the longitudinally extending edge of said recess and, in dropping from the ramp plate with its cusp or pointed end first, it depresses the horizontally disposed radial end portion 1150 of the rotary switch actuating arm 1146 against the urgency of the torsion spring 1152 forcing said end portion into a clearance 1159 left between the confronting side edges 1091a and 1091b of the shell segments of each pocket 1084. The resultant rotation of cam disc 1156 places a depression 1160 in its edge opposite the interponent 1158 which permits said interponent to close the switch 1142. In consequence thereof, the solenoid 1132 is energized and retracts its armature against the urgency of spring 1138. With positive support thus removed from the latch dog 1126, said dog is kicked out of engagement with the rack 1124 and the carriage channel is permitted to follow the urgency of the powerful coil spring 1118 and withdraw from the C-shaped mounting channel in a direction transversely across the carton supply conveyor. However, as soon as the egg dropping from the eighteenth feed track into a pocket 1084 has entered the pocket, it releases the radially directed end portion 1150 of the switch actuating arm 1144, and the torsion spring 1152 returns the cam 1156 mounted upon its inner end to its normal position causing the switch 1142 to open. As a result thereof, the solenoid 1132 is de-energized, and the spring 1138 returns the armature 1130 into its projected position wherein its forces the latch dog 1126 to engage the rack 1124. Hence, further advance of the carriage is positively blocked after it has moved by a distance equal to the distance between two consecutive rack teeth 1140 which aligns the next succeeding one of its pockets with the end of the eighteenth feed track. Thus, with every egg that is dropped into a pocket 1084 below the feed track 852, the carriage is advanced by a distance that will place the next succeeding pocket below the eighteenth feed track until all the pockets in the carriage are filled.

When an egg drops into the last of the six pockets 1084 and the latch dog 1126 is again kicked out of engagement with the rack 1124, the carriage must be allowed to advance until its six pockets are properly positioned above the pockets of a carton or cardboard grid placed upon the adjacent carton supply conveyor. Accordingly, the last latching tooth 1162 on the rack 1124 is spaced a longer distance from its preceding rack tooth 1140 as best shown in FIG. 20.

Means are provided to prevent escape of succeeding eggs from the feed track 852 while the carriage moves the eggs collected in its pockets above the carton supply conveyor and delivers them into the pockets of a carton or cardboard grid, until the carriage has returned to its initial position wherein it places again an empty pocket before the discharge end of the eighteenth feed track. For this purpose an arched gate 1164 is firmly supported upon a horizontal shaft 1166 that extends longitudinally of the carriage at a point opposite to and slightly above the level of the discharge end of the eighteenth feed track. The shaft 1166 is rotatably received within a mounting block 1167 that rises from the upper flange 1148 of the stationary mounting channel 1074. Above the upper flange 1168 of the carriage channel 1080, the gate 1164 forms a foot 1170 that is twisted out of parallelism with the plane of movement of said carriage to form oblique camming surfaces. Directly succeeding the last of its pockets 1084, the carriage channel 1080 carries on its upper flange 1168 a camming stud 1172 (FIG. 4) and whenever upon delivery of an egg into the final pocket 1084, the carriage channel is released in the above described manner to move entirely over the carton supply conveyor, said stud 1172 strikes against the foot 1170 of the pivoted gate 1164 from within the concave side thereof, and swings said gate about the center axis of shaft 1166 from the position illustrated in FIG. 5 into the position illustrated in FIG. 6 which is determined by engagement of a stop lug 1174 formed on the right edge of the gate 1164 as viewed in FIG. 12 with the respective side wall 1175a of a rotation limiting niche 1176 that is formed in the adjacent face of the mounting block 1167. In said position, the gate 1164 places a bar 1178 across the eighteenth feed track at a distance above said track approximately half the diameter of an average egg as best shown in FIG. 17. As the carriage continues to move across the carton supply conveyor 1064, the stud 1172 clears the foot 1170 of the gate and said gate is retained in the described feed-track blocking position by engagement of a spherical spring-urged detent 1180 with a flat surface 1182a formed on the shaft 1166 within the mounting block 1167 (FIGS. 12 and 13). Hence, no egg can escape from the eighteenth feed track and soil parts of the machine or the floor.

As the carriage 1080, its pockets filled with eggs, reaches its outermost position under the urgency of coil spring 1118, which position is determined by engagement of the latch pawl 1126 with the innermost tooth 1162 on the rack 1124 (FIG. 20) its tubular pockets are vertically aligned with the pockets of a carton or cardboard grid on the supply conveyor 1064 underneath. At this moment, the bar 1098 which supports the floor board 1094 of the carriage pockets, moves clear of its supporting roller 1096 and said floor board therefore swings under the weight of the eggs in the six pockets against the urgency of a relatively weak restore spring 1184 on its hinges 1095a and 1095b against the vertical wall of the carriage channel 1080 and drops the eggs supported thereon in the manner of a trap door into the aligned pockets of the carton or cardboard grid underneath (FIG. 6). With the eggs discharged from the floor board, the aforementioned restore spring 1184 returns said floor board to its former position wherein the track bar 1098 will again slide above the supporting roller 1096 as soon as the carriage returns to its initial retracted position.

As said board returns to its raised position wherein it forms again the floor of the carriage pockets, it initiates operation of mechanism that returns the carriage to its retracted position. Said mechanism comprises a pulley 1186 (FIG. 10) that is rotatably mounted upon the same pivot stud 1112 which mounts the hereinbefore mentioned pulley 1106 that guides the cord 1104 which urges the carriage into its projected position under the force of the coil spring 1118. Trained about said pulley 1186 is another cord 1188, one end of which is secured to the outermost end of the carriage channel as shown at 1190 (FIG. 3), while its other end is anchored in the hereinbefore mentioned mounting bracket 1122 at the outermost end of the stationary channel 1074. The inner hinge pin 1095a of the floor board 1094 is bent to form a hammer-like projection 1194 (FIG. 9), and the momentum of said floor board 1094 as it returns to its carriage-pocket-closing position under the urgency of restore spring 1184 brings said hammer-like projection 1194 through a window 1196 in the vertical wall 1076 of the carriage channel 1080 into contact with the end of the actuating arm 1198 of a normally open switch 1200 that is supported on the outer surface of the vertical wall 1076 of the stationary channel 1074. Said actuating arm 1198 projects through a suitable window 1202 in said vertical channel wall 1076 and may be provided with a roller 1204 to receive the impact of the hammer-like projection 1194.

The switch 1200 lies in the power circuit of a relay 1206 and when said switch is closed in the described manner said relay is energized (FIG. 20). Shunted across the relay 1206 is a holding switch 1208 which is closed by the relay 1206 as soon as said relay is energized, and which remains closed to maintain the relay 1206 energized after the momentum of the hammer-like projection 1194 has spent itself and the initially mentioned switch 1200 returns to open position. Likewise controlled by the relay 1206 is a normally open switch 1210 that lies in the power circuit of the hereinbefore mentioned solenoid 1108. When the relay 1206 is energized by closure of switch 1200 and remains energized by closure of the holding switch 1208, it closes the switch 1210 in the power circuit of solenoid 1108 and maintains said switch in closed position. As a result thereof, the solenoid 1108 is energized and retracts its tubular armature 1116 drawing the pulley 1186 to the left as viewed in FIG. 3. This is effective to retract the carriage through cord 1188, with the obliquely rising rear edges of the teeth 1140 on rack 1124 camming the latching pawl 1126 out of the way until the carriage reaches its fully retracted position wherein its foremost pocket lies again in front of the eighteenth feed track (FIG. 2).

To cushion the described return of the carriage under the force of solenoid 1108, the left or rear end of said solenoid is closed off by a disc 1212 provided with a single aperture 1214 of pin point diameter through which the air within the tubular interior of the solenoid may escape at only a very slow rate. Hence, as the armature 116 of solenoid 1108 is retracted by energization of said solenoid, the air entrapped within said solenoid between the inner end of the armature and the disc 1212 acts as a cushion that retards the return movement of the carriage and will only gradually bleed out through the aperture 1214.

As the carriage reaches its fully retracted position, an actuating lug 1215 secured to its inner end (FIG. 4) contacts the actuating arm 1216 of a normally closed switch 1218 and throws said switch into open position. The switch 1218 is located in the power circuit of the relay 1206. Thus, as it is opened, it interrupts said power circuit and de-energizes the relay 1206 which is effective to release the normally open holding switch 1208 and the switch 1210 which lies in the power circuit of the solenoid 1108. This causes de-energization of the carriage return solenoid 1103 and reconditions the carriage for another operational cycle.

Return of the carriage to its initial position is also effective to unlock the arched gate mechanism 1164 that barred the feed track after the last of the pockets in the carriage had been filled with an egg, as previously explained, and which remained in feed-track-blocking position during the above described egg discharge and carriage return operations. As the carriage returns to its initial position in the manner described hereinbefore, a camming stud 1220 projecting upwardly from its top flange 1168 strikes against the twisted foot 1170 of the gate mechanism 1164 from without its arc and swings said gate mechanism about the axis of its horizontal shaft 1166 into the raised position illustrated in FIGS. 2 and 12 wherein its stop lug 1174 abuts the opposite wall 1175b of the rotation limiting niche 1176 in block 1167 and wherein the blocking bar 1178 on its free end is lifted sufficiently high above the eighteenth feed track to pass maximum sized eggs and is retained in said raised position by engagement of the detent 1180 with another flat surface 1182b on shaft 1166. Now the foremost pocket of the carriage may receive an egg from the eighteenth feed track and another cycle in the operation of the carriage may commence.

As the carriage returns to its initial retracted position in the manner described above, mechanisms enter into operation that act to advance the carton or cardboard grid on the carton supply conveyor by a distance equal to the width of one of its rows of pockets, or which cause discharge of a previously filled carton or cardboard grid and place another carton or cardboard grid into position with their front row of pockets below the path of the carriage so as to present a row of empty pockets to the row of eggs that is newly collected by the carriage.

The carton feed conveyor 1064 comprises an endless belt 1230 whose upper run 1231 extends horizontally below the path of the above described egg collecting carriage 1070 as shown in FIG. 14. Said belt is trained about a pair of drums 1232 and 1234 that are mounted upon an idler shaft 1236 and a drive shaft 1238, respectively. Said shafts are rotatably supported in the side panels 1240 and 1242 of a channel structure 1244 that is suitably supported from the machine frame in a position parallel and adjacent to the oiling conveyor (FIG. 19). Said side panels are formed at either side of a horizontal panel 1246 that is situated above the drums 1232 and 1234 and which is of a transverse width about equal to the cartons or cardboard grids to be handled by the described mechanism. The upper run 1231 of the endless belt extends through a suitable slot 1247a and a recess 1247b, respectively, in said horizontal panel and is supported upon said panel as best shown in FIG. 14.

Mounted upon the side panels 1240 and 1242 above the upper run 1231 of belt 1230 at areas in front of the transverse path of the egg accumulating carriage when viewed in the direction of movement of said upper run, are the two hereinbefore mentioned supply magazines 1066 and 1068. The latter one is of a width and breadth sufficient to snugly receive a square-shaped cardboard base 1060 with a cardboard grid 103 resting loosely thereon (FIG. 19) and the upper ends of the side walls 1248 and 1250 of said magazine 1068 are preferably flared outwardly as shown at 1252 in FIG. 14 to facilitate insertion of said cardboard bases and said grids. The open bottom end of the magazine 1068 is normally blocked by a gate mechanism 1254 that is adapted upon actuation to pass a single one of the base plates 1060 with one cardboard grid 103 resting thereon onto the upper run 1231 of the endless conveyor belt underneath. Having reference to FIGURE 14, said gate mechanism comprises a pair of narrow shelves 1256 and 1258 that are rigidly mounted with one of their long edges upon horizontal spindles 1260 and 1262, respectively. Said spindles are rotatably supported in the side walls of the magazine 1068 near the front and rear edges thereof, and are normally held in a rotary position wherein their respective shelves are horizontally disposed and project with their free edges 1261 and 1263 toward each other and into the interior of the magazine so that they may effectively block the bottom end of the magazine and support any stack of superposed base plates and cardboard grids within said magazine.

Means are provided, that may be operated to dip the two shelves 1256 and 1258 simultaneously for a brief moment so that they may deliver the lowermost base plate with its cardboard grid resting thereon onto the conveyor belt underneath. For this purpose, the spindle 1262 is rigidly secured at one of its ends to a short arm 1264 whose free end is pivoted to a substantially vertically extending link 1266 that in turn is pivotally secured to the normally downwardly projected armature 1268 of a vertically positioned solenoid 1270 suitably supported from a front flange 1272 of the side wall 1248 of magazine 1068 (FIGS. 1 and 14). At its opposite end the spindle 1262 is likewise provided with a short arm 1274 which is downwardly directed and which is pivotally connected through an elongated interponent 1276 to another short arm 1278 that extends upwardly from, and is rigidly secured to the corresponding end of the other spindle 1260. Upon energization of the solenoid 1270, when its armature 1268 is retracted, both the shelves 1256 and 1258 dip downwardly. When this occurs the lowermost base plate 1060 in the magazine is released and the whole stack of base plates 1060 and cardboard grids 103 drop within the magazine upon the conveyor belt 1246. The solenoid 1270, however, is energized for only a very brief moment, and when it is de-energized the resultant return of its armature to its downwardly projected position returns the shelves 1256 and 1258 to their normal substantially horizontal position. As the shelves return to their horizontal position, they engage below the next higher base plate 1060 and lift said plate together with the remaining stack of cardboard and grids and base plates within the chute above the lowermost base plate and cardboard grid that remain upon the conveyor belt 1230. Lest the immediate return of the shelves 1256 and 1258 to their horizontal magazine-blocking position may crush the cardboard grid above the lowermost base plate and prevent it from fully descending with said lowermost plate, the inner edges 1261 and 1263 of said shelves may be provided with arcuate recesses 1284 corresponding to the projecting ends 1286 of the partitioning walls 1288 of the cardboard grids. Hence, the shelves 1256 and 1258, as they return above the released base plate, are unable to engage the projecting ends 1286 of the lowermost cardboard grid, and yet will effectively engage the next higher base plate with the tongues 1290 formed between their arcuate recesses 1284.

The second magazine 1066 (FIG. 14) is of smaller compass than the one described above to snugly receive a stack of the usual egg cartons 910 which hold two parallel rows of eggs each comprising six eggs. Said second magazine 1066 may be arranged to face with its open side wall in the direction of movement of the upper run 1231 of the conveyor belt 1230 as shown in FIG. 14 and is provided with a gate mechanism 1292 that normally blocks its open lower end but may be operated by energization of a solenoid 1294 supported from an end wall 1296 to release a single carton for delivery onto the conveyor belt 1230 underneath. Having reference to FIG. 20 said carton release mechanism comprises a pair of pinions 1298 and 1300 firmly mounted upon spindles 1302 and 1304, respectively, that are rotatably supported from, and exteriorly of, the opposite end walls 1296 and 1306 of the magazine and which may be kept under suitable covers. Each of said pinions meshes with upper and lower horizontally disposed racks 1312a, 1314a, and 1312b, 1314b, respectively, that may project through centrally located apertures in the end walls 1296 and 1306 of the magazine (FIG. 14). Normally the rotary position of the pinions 1298 and 1300 is such that the lower racks 1314a and 1314b are projected into the magazine where they may engage the central bottom recesses 1316 (FIG. 14) of the lowest one of the cartons 910 stacked above each other in the magazine with their lids in vertically unfolded position as shown in FIG. 14.

Means are provided in the form of the before mentioned solenoid 1294 that briefly turn both pinions in unison in such a manner that the lower racks 1314a and 1314b are withdrawn from the magazine to release the lowermost carton therein, while the upper racks 1312a and 1312b are projected into the magazine to prevent the directly succeeding carton from following suit. For this purpose, the normally downwardly projected armature 1318 of the vertically positioned solenoid 1294 is pivotally connected through a link 1320 to the upper arm 1322 of a bell crank 1324 that is firmly mounted upon the spindle 1304 of pinion 1300. The lower arm 1326 of said bell crank in turn is pivotally connected through an elongated interponent 1328 to the end of an upwardly directed arm 1330 that is firmly mounted upon the spindle 1302 of the other pinion 1298. When the solenoid 1294 is energized at a time and in a manner to be described in greater detail hereinafter, the armature 1318 thereof is retracted which turns the bell crank 1324 and hence the pinion 1300 in counterclockwise direction as viewed in FIG. 20. This is effective to retract its lower rack 1314b from, and project its upper rack 1312b, into the magazine 1066. Counterclockwise rotation of the bell crank 1324 is also effective, through interponent 1328, to swing the arm 1330 of spindle 1302 and hence the opposite pinion 1298 in clockwise direction as viewed in said FIG. 20, which retracts the lower rack 1314a of pinion 1298 while projecting the upper rack 1312a thereof into the magazine 1066. Thus, the lowermost carton in the magazine chute which was firmly supported upon the lower racks 1314a and 1314b is deprived of support and drops onto the conveyor belt 1230 underneath, while the upper racks 1312a and 1312b move inwards, and prevent the next higher carton from following suit. As will be seen from FIG. 14, the described release mechanism is disposed sufficiently high above the upper run 1231 of the carton supply conveyor to permit a carton dropping from the magazine onto said conveyor with its lid in upwardly unfolded condition to clear the next higher carton that is retained upon the upper racks 1312a and 1312b. As soon as the solenoid 1294 is de-energized, however, the upper racks are withdrawn while the lower racks return to their inwardly projected position. Hence, the whole stack of superposed cartons in the magazine drops by a distance equal to the vertical distance between the upper and lower racks and comes to rest with its lowermost carton upon the inwardly projected ends of the lower racks.

When a carton has been dropped in the described manner upon the upper run 1231 of the continuously operating conveyor belt 1230, said belt carries it against a pair of stops 1332a and 1332b that are arranged to arrest advance of the carton on the belt in a position wherein its foremost transverse row lies directly below the path of the egg collecting carriage 1070. Means are provided in accordance with the invention that disable said stops after the carriage has delivered its eggs into the first pocket row of the carton arrested thereby and as it commences to return to its initial egg receiving position, whereupon the carton may proceed on conveyor 1230 until it comes against another similar set of stops that aligns its second row of pockets below the path of the egg collecting carriage. Along the upper run 1231 of the carton feed conveyor there are provided as many sets of stops 1332a and 1332b as there are transverse pocket rows in the maximum sized carton or cardboard grid that is to be handled by the packing mechanism of the invention, and the arrangement is such that depending upon the actual number of pocket rows comprised in a particular carton or cardboard grid to be filled with eggs, any unnecessary sets of stops may effectively be disabled prior to commencement of the carton filling operation. Having reference to FIGS. 2 and 19, the horizontal panel 1246 of the channel structure 1244 which supports the conveyor belt is provided with longitudinal slots 1334a and 1334b at either side of the upper run 1231 of said belt. Through said slots may project six sets of transversely aligned stop bars 1332a and 1332b corresponding to the six rows of egg pockets provided in the hereinbefore described cardboard grids 103. Said pairs of stop bars are spaced apart in a direction longitudinally of the conveyor belt by a distance equal to the width of the individual pocket rows.

Each two transversely aligned stop bars 1332a and 1332b rise from mounting blocks 1336a and 1336b, respectively, that are firmly secured to a common transverse spindle 1338 which is rotatably supported in a pair of bearing blocks 1340 (FIGS. 14 and 16). The bearing blocks 1340 of all the six spindles 1338 comprised in the carton control mechanism of the invention are secured to the longitudinal edges of a shield 1342 that is suitably supported from the underside of the hereinbefore described horizontal panel 1246 of the channel structure 1244. Said shield is arranged to support the lower or return run 1343 of said belt 1230 which may be guided to and from the level of said shield by a pair of idler rollers 1344 and 1346 that are rotatably supported from the side panels 1240 and 1242 of structure 1244 adjacent the end edges of the shield 1342 as best shown in FIG. 14. Counterweights 1348 secured to the spindles 1338 yieldably urge said spindles into an extreme clockwise position as viewed in FIGS. 14 and 16 which is determined by contact of stop studs 1350 secured to the spindles 1338 with the underside of the shield 1342 and wherein the stop bars 1332a and 1332b project vertically through the elongated slots 1334a and 1334b above the level of the horizontal panel 1246 into carton blocking position.

To prevent the stop bars 1332a and 1332b from yielding against the urgency of the counterweights 1348 under the force of a carton carried against them by the continuously operating conveyor belt 1230, one of the stop bars in each set projects below its mounting block 1336b to form a tail 1352 that is engaged by a latch dog 1354 (FIG. 16). Each of said latch dogs is pivotally supported from the walls of a channel 1355 provided in the upper face of a mounting block 1356, and is held in a raised tail-blocking position by suitable spring means 1358 interposed between its head 1360 and the floor of channel 1355. The mounting blocks 1356 of all the six latch dogs 1354 comprised in the illustrated embodiment of the carton positioning mechanism are firmly mounted upon a common shaft 1362 that extends longitudinally along and below the horizontal panel 1246 of channel structure 1244 and which may be rotatably supported from the side panel 1240 of said channel structure by suitable bearing gussets 1364 (FIG. 14).

Means are provided to turn the shaft 1362 through an arc sufficient to move the heads 1360 of the latch dogs 1354 sideways clear of the tails 1352 of their respective stop bars whenever the egg collecting carriage 1070 returns to its initial egg receiving position, so that a set of stop bars against which a filled or partially filled carton or cardboard grid may bear at the moment, is free to yield and may swing on its spindle 1338 below the level of the horizontal panel 1246. This permits a carton to proceed under the force of the continuously moving belt 1230 until it comes against the next set of stop bars, the arrangement being such that by this time the shaft 1362 has returned to its initial position wherein the latch dog 1354 associated with the next set of stop bars maintains said next stop bars in carton-blocking position. For this purpose, the shaft 1362 is yieldably held in its stop bar latching position by a spring 1366 tensioned between one end of a stud 1368 that projects radially from shaft 1362 and a stud 1370 that projects downwardly from the shield 1342, with the oppositely projecting end of said first mentioned stud 1368 bearing against a position determining stop ledge 1372 that may be formed by an inwardly turned flange of the side panel 1340 of channel structure 1244 (FIG. 16).

To rock the shaft 1362 out of the defined stop-bar-latching position, it carries an arm 1374 whose pointed end 1376 is engaged by a jaw 1378 which is pivotally supported in the buffer-shaped head 1380 of the normally projected armature 1382 of a solenoid 1384. Said solenoid 1384 may be supported in any suitable manner from the shield 1342, such as by means of the aforementioned stud 1370. Whenever the solenoid 1384 is energized, its jaw 1378 pulls the arm 1374 in counterclockwise direction as viewed in FIG. 15 which swings the shaft 1362 against the urgency of spring 1366 into a rotary position wherein the latch dogs 1354 clear the tails 1352 of their respective stop bars. As the armature 1382 of solenoid 1384 reaches its fully retracted position, however, contact of a foot 1386 formed on the jaw 1378 with a stationary member 1388 swings said jaw in counterclockwise direction and disengages it from the pointed end 1376 of the arm 1374. As a result thereof, the shaft 1362 may immediately return to its initial stop-bar-latching position under the urgency of the restore spring 1366 so that a carton advancing over a yielding set of stop bars will be positively blocked from further advance as it comes against the next set of stop bars. Upon de-energization of solenoid 1384 its armature 1382 returns to its projected position wherein its yieldable jaw 1378 is again engaged behind the pointed end 1376 of arm 1374 under the urgency of spring means 1390 interposed between the jaw and the buffer-shaped head 1380 of the armature 1382.

The described filling mechanism may be conditioned for operation with two-row cartons or six-row cardboard grids by setting a manually operable switch 1392 to either connect the solenoid 1270 or the solenoid 1294 to the power circuit of the stop bar control solenoid 1384. In the diagram shown in FIG. 20, said switch has been set to connect the solenoid 1294 of the carton magazine 1066 into the circuit of the stop bar control solenoid 1384 so that the described carton filling mechanism may operate with two row cartons 910. In such a case, it is necessary that all but the first two sets of stop bars 1332a and 1332b be turned below the level of the horizontal panel 1246 of channel structure 1244 and are held in this position by a cover plate 1394 that may be clamped over one of the side panels of said structure 1244 as shown in FIGURES 2 and 14. The first carton may then be placed manually against the first of the two effective sets of stop bars 1332a and 1332b and operation of the egg collecting carriage 1070 may be initiated. As soon as the carriage begins its intermittent advance toward and across the conveyor belt 1230, it releases the switch arm 1216 permitting it to return to its normal position wherein it closes the disabling switch 1218 for the carriage return solenoid 1108 so that the control circuit of said solenoid is conditioned for immediate operation upon closure of the hammer-actuated switch 1200. After the carriage has received its full load of eggs, has moved fully above the first row of the carton on the conveyor belt 1230 and has discharged its load into said row of pockets, return of the floor board 1094 to its pocket closing position brings the hammer-shaped projection of its hinge pin 1095a against the control arm 1198 of switch 1200 which is effective to energize the solenoid 1108 and return the carriage to its initial location as previously described. Return of the carriage 1070 to its initial position actuates switch arm 1216 to open the hereinbefore mentioned switch 1218 in the power circuit of control relay 1206, and de-energization of said relay breaks the power circuit of the carriage-returning-solenoid 1108. Actuation of the same switch arm 1216 has the additional effect of closing another switch 1396 that lies in a common branch of the power circuits of the stop-bar-control solenoid 1384 and the carton-magazine-control solenoid 1294. Closure of switch 1396 is effective to energize the stop bar control solenoid 1384 but is ineffective to operate the release solenoid 1294 of the carton magazine 1066 because of the presence of a normally open switch 1398 in the power circuit of the carton magazine control solenoid 1294. Said switch 1398 may be supported from the shield 1342 adjacent the second one of the stop bar supporting spindles 1338 with its actuating arm 1399 disposed below and within the rotary orbit of the rotation limiting stud 1350 of said spindle. Energization of the stop bar control solenoid 1384 withdraws support from the first pair of stop bars 1332a and 1332b so that the carton under the force of the continuously operating conveyor belt 1230 forces them backwards and rides over them until it comes against the second set of stop bars which have been re-latched in effective upright position by the time the carton reaches them as described hereinbefore. The carton with its first row filled is now positioned upon the horizontal panel 1246 of the channel structure 1244 with its second and still empty row of pockets aligned directly below the path of the egg collecting carriage 1070 and said carriage commences another operational cycle in the manner previously described. This again permits return of switch arm 1216 to its normal position wherein it closes switch 1218 and thus reconditions the carriage-return-solenoid 1108 for immediate operation upon discharge of the second row of eggs into the second pocket row of the carton on feed conveyor 1230. In addition, the return of the switch arm 1216 to its normal position breaks the power circuit of the stop-bar-control solenoid 1384 permitting reengagement of its jaw 1378 with the arm 1374 of the latch supporting shaft 1362 and thus conditions the latch-release mechanism for renewed operation. After the carriage has discharged another load of eggs into the second pocket row of the carton and has again returned to its initial position, the resultant closure of switch 1396 effects release of the second set of stop bars 1332a and 1332b and the continuously operating belt may now carry the filled carton over said bars and over the hereinbefore mentioned cover plate 1394 that disables the remaining stop bars and finally over a downwardly slanting feed lip 1400 onto the hereinbefore mentioned discharge conveyor O.

As the filled carton forces the second set of stop bars out of its way and the spindle 1338 from which said stop bars are supported is turned in counterclockwise direction, as viewed in FIGURE 16, the rotation limiting stop stud 1350 of said spindle depresses the actuating arm 1399 of switch 1398 and closes said switch. As a result thereof, the power circuit through the release solenoid 1294 of the carton magazine 1066 is now completed and said solenoid is energized, which is effective to drop a fresh carton onto the conveyor belt 1230 in the manner described hereinbefore, while the counterweights 1352 attached to the spindles 1338 of the depressed stop bars return said stop bars to upright position as soon as the filled cartons have passed over them. When the stop bars are returned to their upright position in this manner, their tails 1352 ride over the backs of their respective latch dogs 1354 and depress said latch dogs against the urgency of spring means 1358 (FIG. 15) until they have passed over the heads 1360 thereof whereupon said spring means raise them into latching position behind said tails.

The alternative circuit through the solenoid 1270 of the release mechanism 1254 for the magazine 1068 filled with base plates 1060 and cardboard grids 103 as established by appropriate manipulation of switch 1392, contains likewise a normally open switch 1406 that prevents energization of said release mechanism until a cardboard grid deposited onto the conveyor belt 1230 has been filled with eggs to its last row and passes over the last pair of stop bars 1332a and 1332b onto the discharge conveyor O. Said switch 1406 is likewise supported from the shield 1342 near the last of the stop bar supporting spindles 1338 with its actuating arm 1407 disposed below and within the rotary orbit of the rotation-limiting stop stud 1350 provided on said last spindle so that it will be closed by said stop stud whenever the discharge of a filled cardboard grid pushes the last pair of stop bars 1332a and 1332b out of its way. With said switch 1406 closed, return of the carriage 1070 to its initial position with resultant closure of switch 1396 will effect power flow through the solenoid 1270 and cause discharge of a new base plate 1060 with a cardboard grid 103 resting thereon onto the carton feed conveyor 1064 which delivers them against the first pair of stop bars 1332a and 1332b so that the egg collecting carriage may fill its first row of pockets during the next operation cycle of the machine.

While a particular embodiment of the present invention has been shown and described, it will be understood that the particular details herein set forth are capable of modification and variation without departing from the principles of the invention and that the scope of the invention should be limited only by the scope and proper interpretation of the claims appended hereto.

The invention having thus been described, that which is believed to be new and for which protection by Letters Patent is desired is:

1. An egg transfer mechanism for depositing eggs into containers comprising a carriage having a row of egg receiving pockets, means mounting said carriage for movement from an egg receiving position adjacent a supply line to a discharging position above the upper end of a container, means operable upon deposit of eggs into all the pockets of the carriage to move the carriage to said discharging position, and means operable upon discharge of the eggs from said carriage to effect return movement of the carriage to said receiving position.

2. An egg transfer mechanism for depositing eggs into containers comprising a carriage having a row of egg receiving pockets, means mounting said carriage for movement from an egg receiving position adpacent an egg supply line to a discharging position above the upper end of a container, means operable upon deposit of eggs into all the pockets of the carriage to move the carriage to said discharging position, means effective to hold an egg container with an empty one of its pocket rows below the pocket row of the carriage at said discharging position, and means operable upon discharge of the eggs from said carriage to effect return movement of the carriage to said receiving position.

3. An egg transfer mechanism for depositing eggs into containers comprising a carriage having a row of egg receiving pockets, means mounting said carriage for movement from an egg receiving position adjacent an egg supply line to a discharging position adjacent the upper end of a container, means operable upon deposit of eggs into all the pockets of the carriage to move the carriage to said discharging position, means operable upon arrival of said carriage at its discharge position to discharge the eggs from said pockets, means effective to hold an egg container with an empty one of its pocket rows below the pocket row of the carriage in said discharging position, and means operable upon discharge of the eggs from said carriage to effect return movement of the carriage to said receiving position.

4. An egg transfer mechanism for depositing eggs into multi-row egg containers comprising an egg supply conveyor, means associated with said egg supply conveyor for controlling the flow of eggs therefrom, a carriage having a row of egg receiving pockets disposed below the egg supply conveyor, said carriage being arranged for movement from an initial position beneath said egg supply conveyor to an egg discharge position above a container, control means connected to said carriage and operable after an egg has been deposited in each pocket of a row of pockets for moving said carriage to its egg discharging position, means effective to hold an egg container with one of its pocket rows below the pocket row of the carriage in its egg discharging position, and means operable upon arrival of the carriage at its egg discharging position to discharge the eggs in its pockets into the pockets of the container.

5. In an egg transfer mechanism for collecting a row of eggs fed thereto from an egg supply line and depositing the row of eggs into an egg container, a reciprocable carriage having a row of egg receiving pockets, said carriage being arranged for movement from an initial position adjacent the end of the egg supply line to an egg discharging position, gate means associated with said carriage for controlling the movement of eggs from the egg supply line into pockets of the carriage, camming means mounted on said carriage and engaging said gate in said initial position of the carriage to hold said gate in open position, means operative upon deposit of eggs into said pockets to advance said carriage toward its egg discharging position, stop means effective to hold an egg container with one of its pocket rows below the pocket row of the carriage in its egg discharging position, and means operable upon arrival of the carriage in its egg discharging position to discharge the eggs from the carriage pockets into the pockets of the container.

6. In an egg transfer mechanism for collecting a row of eggs fed thereto from an egg supply line and for depositing the row of eggs into the pocket row of an egg container, a reciprocable carriage having a row of egg receiving pockets, said carriage being arranged for movement from an initial position adjacent the end of the egg supply line to an egg discharging position, gate means associated with said carriage for controlling the movement of eggs from the egg supply line into pockets of the carriage, first camming means mounted on said carriage and engaging said gate in said initial position of the carriage to open the gate, means for advancing said carriage toward its discharge position upon movement of eggs into said pockets, second camming means mounted on said carriage for engaging and closing said gate when the last egg is deposited in the carriage, means effective to hold an egg container with one of its pocket rows below the pockets of said carriage in said egg discharging position, and means operable upon arrival of the carriage in its egg discharging position to discharge the eggs from the carriage pockets into the pockets of the container.

7. An egg transfer mechanism for depositing eggs fed thereto into egg containers comprising an egg supply conveyor, gate means for controlling the flow of eggs from the discharge end of said egg supply conveyor, a carriage having a row of egg receiving pockets disposed to receive eggs controlled by said gate means, said carriage being movable from an initial position adjacent said gate means to an egg discharging position, means operable upon deposit of eggs into all the pockets of said carriage to advance said carriage to its egg discharging position, means effective to hold an egg container with an empty one of its pocket rows below the pocket row of the carriage in its egg discharging position, means operative upon arrival of the carriage in its egg discharging position to discharge the eggs in its pockets into the pockets of the container and to effect return movement of the carriage to its initial position.

8. An egg transfer mechanism for depositing eggs into multi-row egg containers comprising a continuously operating container conveyor, means operable to feed empty containers individually to said conveyor, a reciprocable carriage having a row of egg receiving pockets and being mounted for movement from an initial position at the end of an egg supply line to an egg discharging position above said container conveyor, normally effective spaced pairs of stop bars mounted on said container conveyor at points where one pocket row of a container arrested by a pair of said stop bars is disposed directly below the path of said carriage pockets across the conveyor, means operative upon arrival of the carriage in its egg discharging position to discharge the eggs in said carriage pockets into the pockets of the container positioned therebelow, and means operative on discharge of the eggs from said carriage pockets to effect return movement of the carriage to its initial position to temporarily disable said stop bars and to actuate said container feed means.

9. Apparatus for filling the pocket rows of egg containers with eggs from a single-file egg supply line comprising an egg container conveyor, container feeding means operable to feed empty egg containers individually to said conveyor, an egg collecting and distributing carriage having a row of egg receiving pockets disposed transversely to said egg supply line, means mounting said carriage for movement from an initial position at the end of said egg supply line to an egg discharging position above said conveyor, means operative upon deposit of an egg into a pocket of said carriage for advancing the carriage in a direction across said conveyor, a series of normally effective stop bars mounted on said conveyor for arresting a container thereon at points successively indexing pocket rows of the container with said carriage pockets in the discharge position of the carriage, said stop bars being arranged in transversely aligned pairs of bars spaced in the direction of movement of said conveyor, means operative when said carriage arrives at its discharge position above said container for releasing eggs in said carriage pockets to drop into the pockets of the container, carriage retracting means operable upon discharge of the eggs in said carriage pockets for returning the carriage to its initial position and for disabling the pair of said stop bars arresting the container, and means effective upon advance of a filled container beyond the last downstream pair of said stop bars to actuate said container feeding means to position an empty container on said conveyor.

10. Apparatus for filling the pockets of multi-row egg containers with eggs from an egg supply line comprising a container supply conveyor, a magazine adapted to hold a stack of empty superposed egg containers above said conveyor, means operable to feed one of the containers in the stack onto said conveyor, a carriage having a row of egg receiving pockets mounted adjacent the egg supply line for reciprocating movement from an initial position adjacent the end of said egg supply line to an egg discharging position where said carriage pockets are disposed above a pocket row of a container on said conveyor, yieldable stop bars mounted on said conveyor at positions arresting a container with one of its pocket rows disposed directly below said pockets of the carriage in their egg discharging positions, means normally effective to positively hold said stop bars in container arresting positions, means operative upon deposit of eggs from the egg supply line into the pockets of said carriage to advance said carriage toward its egg discharging position over the container, means operative upon arrival of the carriage in its egg discharging position to discharge the eggs carried in its pockets into pockets of the container, means operative upon discharge of the eggs from the container pockets to effect return movement of the carriage to its initial position and to temporarily disable said stop bars to cause the stops to yield under the force of the advancing container, and means operative upon yielding of said stop bars to actuate said container feeding means.

11. Apparatus for filling pockets of multi-row egg containers with eggs comprising a single-file egg supply conveyor, a container supply conveyor, a magazine adapted to hold a stack of empty superposed egg containers disposed above said container conveyor, means operable to feed one of the containers in the stack onto said container conveyor, a carriage having a row of egg receiving pockets disposed adjacent and transversely to said egg supply conveyor for reciprocating movement from an initial position wherein its leading pocket is disposed adjacent the end of egg supply conveyor to an egg discharging position where carriage pockets are disposed directly above a pocket row in an empty carton on said container conveyor, gate means for controlling the flow of eggs from said egg supply conveyor to the pockets of said carriage, means operative upon movement of an egg through said gate and into a pocket of said carriage to advance said carriage a limited distance in a direction toward said container conveyor, a series of transversely aligned pairs of yieldable stop bars mounted on said container conveyor spaced apart longitudinally of the conveyor by a distance equal to the center-to-center distance of the pocket rows of the containers, means normally effective to positively hold said stop bars in container blocking position, the downstreams pair of said stop bars being located at a point where the leading transverse pocket row of a container arrested thereby is disposed directly below the path of the carriage across said container conveyor, means operative upon arrival of the carriage in its egg discharging position above the container to discharge the eggs in its pockets into the pockets of the container, means operative upon discharge of the eggs from said carriage pockets to effect return movement of the carriage to its initial position and to temporarily disable said stop bar holding means to cause the engaged pair of stops to yield under the force of the advancing container, and means operative upon the yielding of the last upstream pair of said stop bars to actuate said container feed means in order to deposit an empty container on the container conveyor.

12. An egg transfer mechanism for depositing preclassified eggs into containers comprising, an indexible carriage having egg receiving pockets, conveyor means for moving and locating such eggs for reception by said pockets, said carriage and said conveyor means being located to effect movement of such eggs therebetween solely by gravity, means for locating said pockets in alignment with such containers to effect transferral of such eggs thereto, and means responsive to the transferral of such eggs to said pockets for indexing said carriage.

13. An egg transfer mechanism for depositing preclassified eggs into a container comprising, an indexible carriage having a plurality of egg receiving pockets, conveyor means for moving and locating such eggs for reception by said pockets, said carriage and said conveyor means being located to effect movement of such eggs therebetween solely by gravity, means responsive to the movement of such eggs to said pockets for indexing said carriage in order to successively locate adjacent pockets of said carriage for receiving eggs from said conveyor means, and means for simultaneously releasing eggs from a predetermined number of adjacent pockets for reception by such a container.

14. An egg transfer mechanism for depositing preclassified eggs into containers comprising, a carriage having egg receiving pockets, conveyor means for moving and locating such eggs for reception by said pockets, said carriage and said conveyor means being located to effect movement of such eggs therebetween solely by gravity, means for locating said pockets of said carriage in alignment with such containers to effect transferral of such eggs thereto, means for rendering said conveyor means momentarily ineffective at least when said pockets are located in alignment with such a container, and means operable when said pockets of said carriage are in alignment with such container for releasing such eggs to effect reception thereof by such container.

15. An egg transfer mechanism for depositing eggs into a row of pockets of a container comprising a conveyor for advancing eggs in single file to a discharge station, a transfer carriage mounted for movement in a single horizontal plane through said discharge station, said carriage having a plurality of carrier units, each unit having egg support means movable when actuated from an egg-retaining position to an egg-release position, means operable when an egg is discharged from said conveyor and deposited in one of said carrier units for indexing said transfer carriage to position the next adjacent carrier unit in egg-receiving position directly below said conveyor at said discharge position in position to receive an egg discharged solely by gravity therefrom, a predetermined number of said indexing movements being effective to position a predetermined number of carrier units above a container to be filled, with each unit being disposed vertically above a pocket in the container, and actuating means operable incident to the arrival of said predetermined number of carrier units above the carton for actuating said egg support means of said units causing eggs to drop from said carrier units into the container.

References Cited by the Examiner

UNITED STATES PATENTS

| | | | |
|---|---|---|---|
| 1,869,457 | 8/32 | Benoit | 53—247 |
| 2,045,767 | 6/36 | Funk | 53—246 X |
| 2,717,729 | 9/55 | Page et al. | 53—160 |

FRANK E. BAILEY, *Primary Examiner.*

ROBERT A. LEIGHEY, *Examiner.*